Patented Nov. 20, 1951

2,575,403

UNITED STATES PATENT OFFICE 2,575,403

CATALYTIC HYDROGENATION OF ACETOPHENONE TO PHENYL METHYL CARBINOL

Donald M. Young, Frank G. Young, Jr., and Howard R. Guest, Charleston, W. Va., assignors, by mesne assignments, to Union Carbide and Carbon Corporation, a corporation of New York No Drawing. Original application October 14, 1943, Serial No. 506,214, now Patent No. 2,544,771, dated March 13, 1951. Divided and this application June 14, 1947, Serial No. 754,770

5 Claims. (Cl. 260—618)

We have discovered a new and useful improvement of the art of catalysis. More particularly, the improvement is of the catalytic hydrogenation of acetophenone whereby acetophenone, in the presence of mixed oxides of copper and chromium, is converted selectively to phenyl carbinol, with good yields and efficiencies.

That acetophenone may be hydrogenated to form phenyl methyl carbinol is well known. Phenyl methyl carbinol is important as an intermediate in the production of styrene. According to one series of reactions, ethyl benzene may be oxidized to acetophenone, acetophenone hydrogenated to phenyl methyl carbinol, and the carbinol dehydrated to styrene. It is to be noted that in this series of reactions none of the reagents used or by-products formed in the main reactions is of the nature of a difficulty removable impurity which may remain even in traces to affect adversely the quality of the ultimate product, styrene. The only by-product is water which is readily separated and, aside from the base material undergoing conversion to styrene or an intermediate, the only reagents are the readily available, low cost materials, oxygen and hydrogen.

Although, in the reduction of acetophenone by hydrogen, the only product of the main reaction is phenyl methyl carbinol, not all catalysts are sufficiently selective in their action to form the main product to the exclusion of side reaction products. In some instances, the formation of products by side reactions may increase disproportionately with increase in catalytic activity or other conditions resulting in an increased rate of the main reaction.

Among possible side reaction products are ethyl benzene and cyclohexyl methyl carbinol. In the dehydration of phenyl methyl carbinol to styrene, any cyclohexyl methyl carbinol present therein would be simultaneously converted to vinyl cyclohexane while any ethyl benzene present would pass through unchanged. The boiling points of both vinyl cyclohexane and ethyl benzene lie so close to that of styrene that their separation from styrene by distillation is not accomplished easily. Although no difficulty is encountered in separating ethyl benzene from phenyl methyl carbinol in view of the wide difference in their boiling points, a somewhat different situation is presented by the high boiling cyclohexyl methyl carbinol which distills only about 14° C. below phenyl methyl carbinol at normal pressure, with even less difference at reduced pressures. It does not appear, as far as is known, that the importance of having phenyl methyl carbinol free of such side reaction products has heretofore been recognized in the production of high quality styrene.

We have discovered that acetophenone may be hydrogenated selectively to phenyl methyl carbinol to the substantial exclusion of side reaction products by carrying out the reaction in the presence of a copper-chromium hydrogenation catalyst in which the proportion of chromium to copper, calculated on a metal basis, is from 7 to 25 parts chromium per 100 parts of copper. The catalyst may conveniently be prepared by roasting a mixture of the carbonates of copper and chromium to convert them to the oxides. Usually a temperature of about 300° C. maintained for a period of about 20 to 60 minutes is sufficient for this purpose. The reaction proceeds smoothly, in contrast to the strongly exothermic decomposition accompanying the preparation of some catalysts heretofore proposed, and may be carried out readily on a commercial scale.

In preparing the catalyst, a mixture of copper and chromium carbonates and basic carbonates suitable for roasting may be obtained, if desired, by precipitating the carbonates from an aqueous solution of the metals in the form of such soluble salts as the nitrates, for instance. The precipitating agent may be an aqueous solution of a soluble carbonate, for example, ammonium carbonate, and this procedure has the advantage that the remaining salts formed by the metathesis are water-soluble and easily washed out from the precipitate. Before converting the mixed carbonates to the oxides, it may be found desirable to subject the washed precipitate to a preliminary drying at a temperature of about 90° to 100° C. over a period of 10 to 20 hours approximately.

In carrying out a hydrogenation of acetophenone using the mixture of black oxides as first obtained by decomposition of the carbonates, an induction period may be observed. Where the hydrogenation is to be carried out in a continuous-type process, it may be advantageous to give the catalyst a preliminary activation. For instance, the catalyst may be activated by heating it in acetophenone under hydrogen pressure. Other methods of activation include heating the catalyst in a mixture of phenyl methyl carbinol and acetophenone at atmospheric pressure under a reflux, or with dry ethyl benzene under hydrogen pressure, or in an atmosphere of hydrogen alone. In activating the catalyst, it is desirable that the heating be carried out at a temperature which is usually about 150° to 200° C., although higher and lower temperatures may also be used.

Oxide mixtures in which the copper and chromium are present in an amount from about 9 to 15 parts of chromium per 100 parts of copper are superior catalysts in the hydrogenation of acetophenone selectively to phenyl methyl carbinol, and are preferred. Using a catalyst having this preferred ratio, the hydrogenation not only proceeds at a high rate with negligible amounts of ring hydrogenation and ethyl benzene formation, but the reaction may also be carried out at temperatures and pressures which are low in comparison with those which are commonly employed in hydrogenation processes generally, and phenyl methyl carbinol is obtained in good yield. The catalyst upon activation gives a maximum rate of hydrogenation which is considerably higher than that attainable with catalysts outside the preferred range; and retains its maximum activity over a longer period. The rate of hydrogenation decreases in the direction of both lower and higher chromium content outside the preferred range but it decreases more sharply in the direction of the lower concentration than the higher. The ease of activation appears to increase with increasing chromium content within the limits of the chromium-copper proportions of the present invention. Additionally, catalysts of the preferred proportions may be activated without becoming pyrophoric, and these non-pyrophoric activated catalysts have the advantage that they are less hazardous for large scale commercial operations than a pyrophoric catalyst.

The hydrogenation may be carried out at an elevated temperature and under hydrogen pressure in a conventional pressure reactor. In general, from about 0.5 to 10 parts of catalyst per 100 parts of acetophenone are suitable in carrying out the reaction; but an excess of catalyst is not, of itself, objectionable. Depending largely upon catalyst concentration the hydrogenation may be carried out using hydrogen pressures as low as 50 to 100 pounds per square inch and at temperatures ranging from 130° to 175° C. Higher pressures and temperatures may be used if desired, but ordinarily it is unnecessary to resort to pressures much above 150 to 200 pounds per square inch or to temperatures substantially higher than 200° C. On the other hand, at temperatures below 120° C., the rate may become too slow to be practicable. The hydrogenation may be carried out in a continuous manner by spraying a mixture of the catalyst and acetophenone into an atmosphere of hydrogen under suitable pressure, using an activated catalyst if desired. The catalyst may be recovered after the hydrogenation is completed, and reused. It may readily be reactivated, if need be by procedures including steaming and roasting, for instance.

The invention may be further illustrated by the following examples:

*Example 1*

A precipitate of the mixed carbonates of copper and chromium was formed by adding an aqueous solution of ammonium carbonate monohydrate, $(NH_4)_2CO_3 \cdot H_2O$, containing 175 grams of the ammonium salt in one liter of water, to an aqueous solution of copper nitrate trihydrate, $Cu(NO_3)_2 \cdot 3H_2O$ and chromic nitrate nonahydrate, $Cr(NO_3)_3 \cdot 9H_2O$, containing 244 grams of the copper salt and 53 grams of the chromium salt in one liter of water. The solution was well stirred during the addition, which required 20 minutes, and for 20 minutes thereafter. The precipitate of mixed carbonates was separated from the liquid by filtration and washed with 1.5 liters of water. The washed precipitate was then agitated with two 500 milliliter portions of water, in succession, each agitation step being followed by filtration and further washing. The material thus obtained amounted to 96 grams after it had been dried in an oven at a temperature of 90° C. for 16 hours. Finally, the dried material was heated at a temperature of 280° to 300° C. for twenty minutes, after it first had been brought up to a temperature of 280° C., while being agitated, over a period of 20 minutes. There was produced 72 grams of black mixed oxides which were found by analysis to have a chromium-copper ratio of 13.8 parts chromium to 100 parts copper, by weight.

*Example 2*

To pure acetophenone, 100 parts, contained in a suitable reaction vessel, was added 2 parts by weight of the black mixed oxides of Example 1 and the mixture thus obtained was heated to about 130° C. Hydrogen was then introduced into the heated mixture under a pressure maintained at an average of about 75 pounds per square inch and the mixture agitated continuously. Under these conditions the oxide mixture was found to be slowly activated, as indicated by the amount of hydrogen consumed. At the end of 93 minutes the hydrogenation was 10 per cent completed. After two hours the rate of hydrogenation began to increase from about 6 per cent per hour until at the end of about 4 hours it reached its maximum of about 32 per cent per hour. Thereafter, the rate dropped as the reaction approached completion until finally the hydrogenation stopped. The product was substantially pure phenyl methyl carbinol obtained in almost quantitative yield.

In comparison with the foregoing results, a copper oxide-chromium oxide catalyst in which the metals were present in the ratio of 2.7 parts chromium to 100 parts copper, by weight, required 2 hours for the hydrogenation to progress to the extent of 10 per cent, using the same hydrogenating procedure of this example. The maximum hydrogenation rate of this low chromium catalyst was only 18 per cent per hour, which was reached after 5.5 hours. In preparing this low chromium catalyst, the procedure described in Example 1 was followed using 288 grams of copper nitrate trihydrate, 13 grams of chromium nitrate monohydrate and 180 grams of ammonium carbonate monohydrate. The amount of catalyst obtained was 82 grams. No improvement in the maximum production rate resulted upon subjecting the low chromium catalyst to the same treatment which was successfully employed to activate catalysts having a higher chromium-copper ratio (see Example 3), although some slight improvement was shown in the time of 44 minutes required for the hydrogenation to proceed 10 per cent.

*Example 3*

To 48 grams of a mixture containing 90 per cent phenyl methyl carbinol and 10 per cent acetophenone was added 4.8 grams of the same black mixed oxides described in Example 1. The mixture was then heated under a reflux condenser by means of an oil bath maintained at a temperature of about 175° C. When the temperature of the mixture reached 170° C., a small volume of hydrogen (about 1 to 2 liters) was evolved. Thereafter, the temperature dropped gradually, as a small quantity of water was formed, until it had reached about 140° C. The entire heating period was about one hour. The black mixed oxides were then recovered by filtering, and washed with acetone. There was obtained about 4.6 grams of non-pyrophroic activated catalyst.

*Example 4*

To 100 parts by weight of pure acetophenone, contained in a suitable reaction vessel, was added 2 parts by weight of the non-pyrophoric activated catalyst prepared as described in Example 3. The mixture was then heated to about 130° C., and hydrogen introduced into the heated mixture under an average pressure of about 75 pounds per square inch while the mixture was being agitated, all precisely as described in Example 2. The catalyst was active from the start and the hydrogenation was 10 per cent completed at the end of 17 minutes in comparison with the 93 minutes required to reach 10 per cent using the unactivated catalyst. The hydrogenation, using the activated catalyst reached its maximum rate of 43 per cent per hour after 40 minutes and this rate was maintained until the hydrogenation was almost complete. Substantially pure phenyl methyl carbinol was obtained in practically quantitative yield.

*Example 5*

A solution consisting of 81 grams of soda ash dissolved in 2 liters of water was added gradually over a period of 50 minutes to a well-stirred solution made by dissolving 121 grams of copper nitrate trihydrate, $Cu(NO_3)_2 \cdot 3H_2O$, and 26 grams of chromium nitrate monohydrate, $$Cr(NO_3)_3 \cdot 9H_2O$$

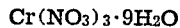

in 2 liters of water. The stirring was continued 20 minutes after the addition had been completed. A precipitate formed, which was a mixture of the copper carbonate and chromium carbonate, and from this point on the treatment of the precipitate was according to the procedure described in Example 1. There was obtained 47 grams of black mixed oxides in which the metals were present in the proportion of 9.8 parts chromium to 100 parts copper, by weight.

A part of the black mixed oxides thus obtained was activated according to the procedure of Example 3 to yield a non-pyrophoric activated catalyst with about the same activity as described in Example 4.

*Example 6*

A mixed oxides catalyst containing copper and chromium in the proportion of 23 parts chromium to 100 parts copper, by weight, was prepared by the method described in Example 1, using 212 grams of copper nitrate trihydrate, 79 grams of chromium nitrate monohydrate and 170 grams of ammonium carbonate monohydrate. The resulting black mixed oxide catalyst thus obtained was slightly less active than the catalyst of Example 1. Under the same conditions as described in Example 2, 100 minutes were required to attain 10 per cent hydrogenation, as against 93 minutes for the black mixed oxides having a chromium-copper ratio of 13.8 parts chromium to 100 parts copper, by weight.

*Example 7*

A part of the black mixed oxides catalyst of Example 6 containing copper and chromium in the ratio of 23 parts chromium to 100 parts copper by weight was activated by the procedure described in Example 3. Using the hydrogenation method of Example 4, the activated catalyst required 20 minutes to take the hydrogenation to 10 per cent. A maximum hydrogenation rate of 37 per cent per hour was attained. The rate dropped off sharply to one per cent per hour as the hydrogenation reaction neared completion. The activated catalyst was not pyrophoric.

*Example 8*

Black mixed oxides catalyst, prepared as described in Example 1 and containing copper and chromium in the ratio of 13.8 parts chromium to 100 parts copper, by weight, was heated by placing it in a U-tube which was, in turn, immersed in an oil bath. The oil bath was maintained at a temperature of 160° C. and hydrogen passed slowly through the tube for six hours. During the first two hours water was produced. The catalyst thus activated was found to be pyrophoric and consequently was discharged directly from the tube, after cooling, into an acetophenone-phenyl methyl carbinol mixture containing 79 per cent of acetophenone. This mixture, containing 5 parts catalyst to 100 parts mixture, was hydrogenated at a temperature of 150° C. and under a hydrogen pressure of 120 to 150 pounds per square inch. At the end of 2.75 hours the phenyl methyl carbinol content of the mixture had been increased to 94 per cent, by weight.

*Example 9*

Black mixed oxides catalyst made by the method of Example 1 and containing copper and chromium in the proportion of 100 parts copper to 13.8 parts chromium, was mixed with dry ethyl benzene in the ratio of 10 parts catalyst to 360 parts ethyl benzene. The mixture was then heated in a pressure reactor to a temperature of 150° C. and hydrogen introduced under a pressure of 60 to 65 pounds per square inch. The pressure was released at one-half hourly intervals to allow the hydrogen to sweep out the small amount of water formed in the partial reduction of the catalyst, and again restored by the introduction of hydrogen. At the end of three hours the catalyst was recovered by filtration and washed with acetone. The catalyst, thus activated, was found to be non-pyrophoric.

To 200 grams of a mixture containing 73 per cent acetophenone and 27 per cent phenyl methyl carbinol in a pressure reactor was added 8 grams of the activated catalyst. The acetophenone-carbinol-catalyst mixture was then maintained at an average temperature of 142° C., and hydrogen introduced at a pressure of 100 to 150 pounds per square inch. In three hours the concentration of phenyl methyl carbinol reached 98 per cent, by weight.

*Example 10*

Acetophenone was hydrogenated to phenyl methyl carbinol continuously as follows:

|  | Parts by weight, per hour | |
| --- | --- | --- |
|  | Run A | Run B |
| Feed Mixture: |  |  |
| Acetophenone | 6.6 | 4.7 |
| Phenyl methyl carbinol | 2.8 | 2.0 |
| Fresh catalyst | 0.016 | 0.033 |
| Product (after filtration): |  |  |
| Phenyl methyl carbinol | 7.1 | 4.7 |
| Acetophenone | 2.1 | 1.9 |
| Ethyl benzene | 0.15 | 0.10 |
| Hours | 9 | 13.5 |

The production rate was 0.55 and 0.37 part of phenyl methyl carbinol per part of acetophenone feed per hour, by weight, for runs A and B, respectively. The temperature was maintained at 150° C. and the pressure at 150 pounds per square inch, for both runs. The catalyst used was prepared according to Example 9, and the average catalyst concentration during both runs was about 2 per cent, by weight, of the reaction mixture.

The invention is susceptible of modification within the scope of the appended claims.

This application is a division of our copending application filed October 14, 1943, Serial No. 506,214, now U. S. Patent 2,544,771 issued March 13, 1951.

We claim:

1. The improvement of the art of hydrogenating acetophenone which consists in producing phenyl methyl carbinol to the substantial exclusion of ethyl benzene or other side reaction products by carrying out the hydrogenation under a hydrogen pressure of about 50 to 200 pounds per square inch, gage, and a temperature of about 120° to 200° C. in the presence of a catalytic amount of a copper-chromium mixed oxides hydrogenation catalyst in which chromium is present in a ratio computed on a metal basis, from about 7 to 25 parts of chromium per 100 parts of copper by weight.

2. The improvement of the art of hydrogenating acetophenone which consists in producing phenyl methyl carbinol to the substantial exclusion of ethyl benzene or other side reaction products by carrying out the hydrogenation under a hydrogen pressure of about 100 to 150 pounds per square inch, gage, and a temperature of about 130° to 175° C. in the presence of a catalytic amount of a copper-chromium mixed oxides hydrogenation catalyst in which chromium is present in a ratio computed on a metal basis, from about 7 to 25 parts of chromium per 100 parts of copper by weight.

3. The improvement of the art of hydrogenating acetophenone which consists in producing phenyl methyl carbinol to the substantial exclusion of ethyl benzene or other side reaction products by carrying out the hydrogenation under a hydrogen pressure of about 50 to 200 pounds per square inch, gage, and a temperature of about 120° to 200° C. in the presence of a catalytic amount of a copper-chromium mixed oxides hydrogenation catalyst in which chromium is present in a ratio computed on a metal basis, from about 9 to 15 parts of chromium per 100 parts of copper by weight.

4. The improvement of the art of hydrogenating acetophenone which consists in producing phenyl methyl carbinol to the substantial exclusion of ethyl benzene or other side reaction products by carrying out the hydrogenation under a hydrogen pressure of about 100 to 150 pounds per square inch, gage, and a temperature of about 130° to 175° C. in the presence of a catalytic amount of a copper-chromium mixed oxides hydrogenation catalyst in which chromium is present in a ratio computed on a metal basis, from about 9 to 15 parts of chromium per 100 parts of copper by weight.

5. The improvement of the art of hydrogenating acetophenone which consists in producing phenyl methyl carbinol to the substantial exclusion of ethyl benzene or other side reaction products by carrying out the hydrogenation under a hydrogen pressure of about 75 pounds per square inch, gage, and a temperature of about 130° C. in the presence of a catalytic amount of a copper-chromium mixed oxides hydrogenation catalyst in which chromium is present in a ratio of about 13.8 parts per 100 parts of copper, by weight, computed on a metal basis.

DONALD M. YOUNG.
FRANK G. YOUNG, Jr.
HOWARD R. GUEST.

REFERENCES CITED

The following references are of record in the file of this patent:

UNITED STATES PATENTS

| Number | Name | Date |
|---|---|---|
| 1,959,313 | Vail | May 15, 1934 |
| 2,040,913 | Amend | May 19, 1936 |
| 2,137,407 | Lazier | Nov. 22, 1938 |
| 2,156,217 | Andrews et al. | Apr. 25, 1939 |
| 2,290,439 | Lenth et al. | July 21, 1942 |
| 2,400,959 | Stewart | May 28, 1946 |
| 2,418,309 | Matuszak et al. | Apr. 1, 1947 |